US011750282B2

United States Patent
Jhaldiyal et al.

(10) Patent No.: US 11,750,282 B2
(45) Date of Patent: Sep. 5, 2023

(54) LEARNING-BASED METHOD AND SYSTEM FOR CONFIGURING AN OPTICAL TIME-DOMAIN REFLECTOMETER IN A GIGABIT PASSIVE OPTICAL NETWORK

(71) Applicant: Centre for Development of Telematics (C-DOT), New Delhi (IN)

(72) Inventors: Pramod Jhaldiyal, New Delhi (IN); Chandan Dung, New Delhi (IN)

(73) Assignee: Centre for Development of Telematics (C-DOT), New Delhi (IN)

( * ) Notice: Subject to any disclaimer, the term of this patent is extended or adjusted under 35 U.S.C. 154(b) by 173 days.

(21) Appl. No.: 17/282,068

(22) PCT Filed: Dec. 12, 2018

(86) PCT No.: PCT/IN2018/050833
§ 371 (c)(1),
(2) Date: Apr. 1, 2021

(87) PCT Pub. No.: WO2020/070752
PCT Pub. Date: Apr. 9, 2020

(65) Prior Publication Data
US 2022/0376782 A1 Nov. 24, 2022

(30) Foreign Application Priority Data
Oct. 5, 2018 (IN) .............................. 201811037838

(51) Int. Cl.
*H04B 10/07* (2013.01)
*H04B 10/071* (2013.01)
*H04B 10/077* (2013.01)

(52) U.S. Cl.
CPC ....... *H04B 10/071* (2013.01); *H04B 10/0771* (2013.01)

(58) Field of Classification Search
CPC ... H04B 10/071; H04B 10/0771; H04J 14/08; H04J 14/025
See application file for complete search history.

(56) References Cited

U.S. PATENT DOCUMENTS 9,909,904 B2 3/2018 Geiger
2005/0271384 A1* 12/2005 Lee ...................... H04B 10/071
398/13

(Continued)

FOREIGN PATENT DOCUMENTS

KR 20140007003 1/2014
KR 20150144280 12/2015

(Continued)

OTHER PUBLICATIONS

International Search Report and Written Opinion issued in Corresponding PCT application No. PCT/IN2018/050833, dated Jun. 19, 2019.

*Primary Examiner* — Dzung D Tran
(74) *Attorney, Agent, or Firm* — Norton Rose Fulbright US LLP

(57) ABSTRACT

The present disclosure provides a method and system for configuring an optical time domain reflectometer (OTDR) in a gigabit passive optical networks (PON), characterized by the steps of: collecting network data of the network to be scanned by switch controller to characterize said network; collecting data from various optical network terminals (ONTs) of the gigabit passive optical networks (GPON) by an OTDR and the Switch Controller to form a training database, the training data is used to train the method; optimizing the parameters of the optical time domain reflectometer (OTDR) based on the network data and the training database by a processor provided on the switching controller using machine learning. For point-to-multipoint (PMP) net- (Continued)

works such as PON, the present method and system provides optimal set of parameters to configure OTDR before performing trace.

7 Claims, 1 Drawing Sheet

(56) References Cited

U.S. PATENT DOCUMENTS

| | | | |
|---|---|---|---|
| 2007/0041006 A1* | 2/2007 | Abbott | H04B 10/071 356/73.1 |
| 2014/0099099 A1* | 4/2014 | Dupuis | H04Q 11/0067 398/17 |
| 2015/0139637 A1* | 5/2015 | Vall-Llosera | G01M 11/3172 398/14 |
| 2015/0365191 A1* | 12/2015 | Lee | H04J 14/0282 398/67 |

FOREIGN PATENT DOCUMENTS

| | | |
|---|---|---|
| WO | WO 2016/198683 | 12/2016 |
| WO | WO 2017/161963 | 9/2017 |

* cited by examiner

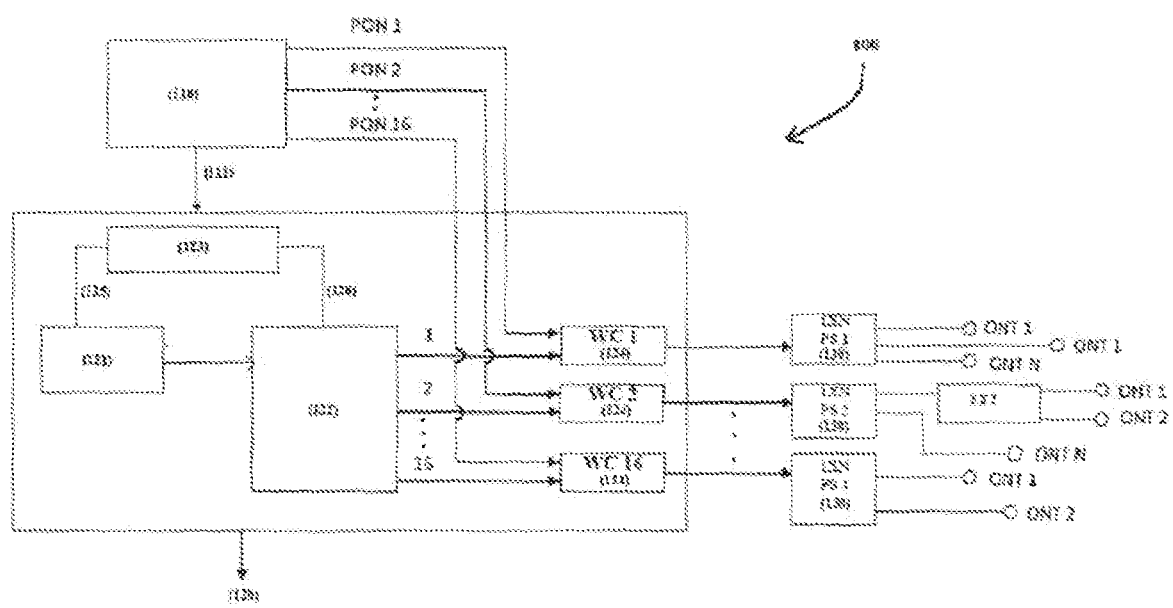

LEARNING-BASED METHOD AND SYSTEM FOR CONFIGURING AN OPTICAL TIME-DOMAIN REFLECTOMETER IN A GIGABIT PASSIVE OPTICAL NETWORK

CROSS-REFERENCE TO RELATED APPLICATIONS

This application is a national phase application under 35 U.S.C. § 371 of International Application No. PCT/IN2018/050833 filed 12 Dec. 2018, which claims priority to Indian Patent Application No. 201811037838 filed 5 Oct. 2018. The entire contents of each of the above-referenced disclosures is specifically incorporated herein by reference without disclaimer.

FIELD OF THE INVENTION

The present disclosure relates to a method and system for configuring an optical time domain reflectometer (OTDR) in passive optical networks, more particularly in a gigabit passive optical networks (GPON) and other passive optical networks (PON) before scanning a network on the occurrence of fault.

BACKGROUND OF THE INVENTION

Optical time domain reflectometer (OTDR) is used worldwide to characterize the optical fiber network in terms of different reflective events, bend losses, splice losses, link loss and optical return loss (ORL).

Some of the disclosures have indicated the implementation of OTDR such as:

D1: WO2017161963A1. D1 relates to a method and device for detecting an optical fiber state. In D1 the data acquired by OTDR is compared with a preset reference value to obtain a deviation value. In the method of D1 as mentioned in page no. 10, following steps are performed;

Setting a reference/preset value
the normal configuration parameters such as maximum pulse width, maximum distance measurement, sampling time etc. are arranged in advance.
The configuration parameters of real time acquisition of measurement data are arranged in advance
Measurement result intelligent diagnosis: the measurement data are compared with the preset value to calculate deviation value.

D2: U.S. Pat. No. 9,909,904B2. D2 discloses an optical fiber system comprises a plurality of activation cells adapted to react to components of a back scattered signals and label the disturbance. In D2, a label can be associated with the one or more features in the backscattered signal. The label will be input to the input devices and the input passes through a plurality of activation cells to produce output. The procedure is repeated for a different feature. The different feature creates a different structure. The learning procedure can then proceed using different ones of the feature. Once the learning is complete, own feature in the backscatter is complete. Thus, in D2 also prior determination of parameters is done by learning. Col. 10 lines 10-13 of D2 discloses that pattern recognition system can be trained to recognize a large number of patterns in the reflectogram using an unsupervised learning process.

D3: WO2016198683A1. D3 discloses a method and apparatus for monitoring pipeline using an optical fiber sensor system. Para [0009] of D3 proposes solution to the issue of incorrect identification of events that is to use an artificial neural network to train the system to recognize the event. Para [0012] of D3 addresses three learning paradigms: supervised learning, unsupervised learning and reinforcement learning.

As disclosed in above mentioned documents, in practice whenever OTDR is used to find the fault or used to characterize the network, OTDR has to be configured first in any case before using it for data acquisition.

OTDR has a few important parameters, such as pulse width, acquisition time and maximum range that need to be configured optimally for better characterization of the network under test. It is network administrator who configures the OTDR parameters based on his knowledge of the network under test, which also requires administrator to be skilled enough to choose correct set of parameters to get best characterization of link and this process needs to be repeated every time if there is any change in the network. Problem becomes worse in case of technology such as GPON, where one OTDR is used to cater more than one passive optical network (PON), which are entirely different optical point-to-multipoint (PMP) networks. In such cases choosing OTDR parameters manually is quite impractical.

To help in such situations, many OTDRs come with auto mode configuration. In auto mode OTDR tries to choose the parameters based on the fiber network. It is also known that most OTDRs are efficient in testing point-to-point (P2P) networks. For point-to-multipoint (PMP) networks such as PON, OTDRs may not be that efficient as the trace received at the central office (CO) is a linear sum of the backscattered and reflected powers from all network branches. In such a case, OTDRs, even in auto mode, which are based on the methods used to calculate parameters for point to point (P2P), do not give optimal set of parameters for PMP networks.

OBJECTIVE OF THE INVENTION

Primary object of the present disclosure is to develop a method and a system which configure OTDR with a set of parameters which are optimal in least square sense using machine learning approach.

SUMMARY OF THE INVENTION

The present disclosure provides a method for configuring an optical time domain reflectometer (OTDR) in a gigabit passive optical networks (PON), characterized by the steps of: collecting network data of the network to be scanned by switch controller to characterize said network; collecting data from various optical network terminals (ONTs) of the gigabit passive optical networks (GPON) by an OTDR and the Switch Controller to form a training database, the training data is used to train the method; optimizing the parameters of the optical time domain reflectometer (OTDR) based on the network data and the training database by a processor provided on the switching controller using machine learning. In an embodiment of the present disclosure, it is disclosed that the parameters of optical time domain reflectometer (OTDR) to be configured for better characterization of network, consist of pulse width, acquisition time and distance range.

In yet another embodiment of the present disclosure, it is disclosed that the OTDR parameters are selected on the basis of network data, consisting of maximum distance of the fiber from optical line terminal (OLT) in the GPON, link loss and optical return loss or a combination thereof.

In an embodiment of the present disclosure, there is disclosed a system (100) for configuring an optical time domain reflectometer (OTDR) in a gigabit passive optical networks (GPON) (110), the system includes: a switch controller (120) configured for collecting network data from a network to be scanned characterizing said network, the switch controller (120) having: an optical time domain reflectometer (OTDR) (121) to be configured, the OTDR (121) and the switching controller operable for collecting data from various optical network terminals (ONTs) of the gigabit passive optical networks (GPON) (110) to form a training database; an optical switch (122), and a processor (123) adapted to configure the optical time domain reflectometer (OTDR) (121) by optimizing the parameters of optical time domain reflectometer (OTDR) (121) based on the network data using the training database.

In yet another embodiment of the present disclosure, it is disclosed that the optical switch is configured to receive signal from optical time domain reflectometer (OTDR) while scanning the network to be scanned.

In still another embodiment of the present disclosure, it is disclosed that the switch controller further comprises a plurality of wavelength division multiplexing (WDM) coupler to couple the output of the optical switch to the gigabit passive optical networks (GPON).

In another embodiment of the present disclosure, it is disclosed that the system (100) further comprises a plurality of passive power splitters (PS) (130) to split coupled output received from WDM coupler (124) towards various ONTs.

These and other features, aspects, and advantages of the present subject matter will become better understood with reference to the following description. This summary is provided to introduce a selection of concepts in a simplified form. This summary is not intended to identify key features or essential features of the subject matter, nor is it intended to be used to limit the scope of the subject matter.

BRIEF DESCRIPTION OF DRAWING

The above and other features, aspects, and advantages of the subject matter will be better understood with regard to the following description, and accompanying drawings where:

FIG. 1: Exemplary GPON system with switch controller.

DETAILED DESCRIPTION OF THE INVENTION

An exemplary embodiment of the device as indicated in FIG. 1 is described below. It is to be understood that both the foregoing general description and the following detailed description are exemplary and explanatory only and are intended to provide further explanation of the subject matter.

FIG. 1 shows an exemplary GPON system (100). The GPON system comprises a GPON Optical Line terminal (OLT) (110) from where various Passive optical networks (PON) terminates. GPON OLT (110) is connected with a switch controller (120) via path (111).

Our proposed method runs in a card of switch controller (120), which is integrated to GPON solution as depicted in the FIG. 1. The switch controller (120) consists of one OTDR (121), one 1×16 optical switch (122), 16 no. of Wavelength division multiplexing (WDM) couplers (124) and a micro-processor MPC8250 (123). The paths (111, 125, 126) by which the OLT (110) connected with the switch controller (120) and the processor (123) connected with the OTDR (121) and optical switch (122) are control paths.

The switch controller (120) will take 16 PON inputs from OLT (110), and one input pulse from OTDR (121) embedded on the switch controller (120). WDM coupler (124) of switch controller (120) sends the multiplexed signal towards the PON side after coupling the signals from OLT (110) with OTDR pulse. All PON networks are independent and may have any number of ONTs (upto 128) and other components. The system may have various passive optical splitters (PS) (130) to split the multiplexed signal received from coupler towards various ONTs.

Whenever OLT detects no upstream power i.e., from ONT to OLT, it is declared as loss of signal (LOS). It is immediately sent to switch controller to acquire fault trace via control path. Switch controller, based on the PON number associated with the fault, selects the appropriated port of optical switch and triggers the OTDR to acquire the trace. Similarly, it switches the port and takes trace if any other fault in different PON is detected. So far OTDR parameters are configured only once by the user interface (UI) and remain same till it is changed again. If, for example, a particular pulse width, which decides the power injected into the fiber and thus decides the distance it can travel, is selected, it might be good enough to see one complete PON but it might not be able to see even half of the network for another PON. Similarly, other parameters may affect the accuracy and characterization of PON. Now the present disclosure provides a method to select optimum parameters for a particular network or PON based on the network configuration, before taking trace. Algorithm for predicting parameters is trained using machine learning approach.

Regression algorithms, a supervised machine learning approach are used in the present disclosure. Following is the brief introduction of the algorithm. Regression algorithms belong to family of Supervised Machine Learning algorithms. Purpose of supervised learning algorithms is to model the dependencies and relationships between the output and input features or dependent and independent variables, to predict the value for new data. The algorithm builds a model on the features of training data and using the model to predict value for new data. The simple linear regression attempts to establish a linear relationship between one independent variables and a dependent variable. In multiple linear regression model there are two or more independent variables and a dependent variable. Whereas in multivariate multiple linear regression both independent variables and dependent variable are two or more.

As there are three independent and three dependent variables i.e, there is a need to choose three OTDR parameters based on three network attributes, so multivariate multiple linear regression method is used to establish the relationship. The present disclosure is providing a brief introduction to multiple linear regression. The general model for multiple linear regression with k independent variables is of the form $$y_i = \beta_0 + \beta_1 x_{i1} + \beta_2 x_{i2} + \ldots + \beta_k x_{ik} + \epsilon_i, \quad i=1,2,\ldots,n.$$

There are total n observations and above equation signifies ith observation, where $y_i$ is dependent variable, $x=[x_{i1}, x_{i2}, x_{i3}, \ldots, x_{ik}]$ are the k independent variables, $\epsilon$ is the estimation or prediction error and $\beta=[\beta_0, \beta_1, \ldots, \beta_k]$ is a vector of regression coefficients. To simplify the computation, we have written the multiple regression model in terms of the observations using matrix notation. Using matrices allows for a more compact framework in terms of vectors representing the independent variable, dependent variables, regression coefficients, and estimation or prediction errors. The model takes the following form $$Y = X\beta + \epsilon$$

and when written in matrix notation, we have $$\begin{bmatrix} y_1 \\ y_2 \\ \vdots \\ y_n \end{bmatrix} = \begin{bmatrix} 1 & x_{11} & \cdots & x_{1k} \\ 1 & x_{21} & \cdots & x_{2k} \\ 1 & \vdots & \ddots & \vdots \\ 1 & x_{n1} & \cdots & x_{nk} \end{bmatrix} \begin{bmatrix} \beta_0 \\ \beta_2 \\ \vdots \\ \beta_k \end{bmatrix} + \begin{bmatrix} \epsilon_1 \\ \epsilon_2 \\ \vdots \\ \epsilon_n \end{bmatrix}$$

It can be noted that Y is an n×1 dimensional random vector consisting of the observations, X is an n×(k×1) matrix determined by the predictors, $\beta$ is a (k×1)×1 vector of unknown parameters, and $\epsilon$ is an n×1 vector of random errors.

The first step in multiple linear regression analysis is to determine, using training data, the vector $\hat{\beta}$, which gives the linear combination $\hat{y}$ that minimizes the length of the prediction error vector. In other words, the vector $\hat{\beta}$ minimizes the sum of the squares difference between $\hat{y}$ and y and later on this vector is used to predict dependent variable $y_i$ when any new test data come. Now, since the objective of multiple regression is to minimize the sum of the squared errors, the regression coefficients that meet this condition are determined by solving the least squares normal equation.

$$X^T X \hat{\beta} = X^T Y$$

An important assumption in multiple regression analysis is that the variables $x_1, x_2, \ldots, x_n$ be linearly independent. Now if the variables $x_1, x_2, \ldots, x_n$ are linearly independent, then the inverse of $X^T X$ will exist, and we can obtain $$\hat{\beta} = (X^T X)^{-1} X^T Y$$

Similarly, regression coefficients for other dependent variables can be estimated.

Following are the description of OTDR parameters and their impact on characterization of network in the form of trace generated by OTDR. They have been chosen as dependent variables or output variables.

1. Pulse Width: Pulse width is the most important OTDR parameter as it affects the dead zone. The OTDR dead zone refers to the distance (or time) where the OTDR cannot detect or precisely localize any event or artifact on the fibre link. If two events fall in the dead zone, OTDR cannot make distinction between two and treat them as one event. It creates severe challenges and need to be solved by using appropriate pulse width. Narrow pulse widths can see more detail on the link and can identify events that are closer, but also produce noise due to low signal-to-noise ratio (SNR). Longer pulses allow OTDR to span longer distance but with higher dead zone.
2. Averaging Time or Acquisition Time: Averaging time decides the number of measurements averaged together to create a trace. This can vary from a few seconds to three minutes. A short averaging time decreases testing time but results in noisy traces, while choosing longer averaging time increases dynamic range and accuracy. Longer averaging time tends to cancel noise in the waveform and produce smooth trace.
3. Distance Range: Distance Range defines the maximum distance from which the OTDR can acquire data samples. The longer the range, the further the OTDR will shoot pulses down the fibre. If the range is set incorrectly, the trace waveform may contain undesirable artifacts, such as ghosts.

Following are the PON network attributes that have been chosen as independent variables or input variables.

1. Maximum Distance: It is the maximum distance of the fibre from OLT in the network. It is important parameter to choose pulse width and range.
2. Link Loss: It is the total loss in the network, due to fibre attenuation, splitter loss, connector loss etc. It is important parameter to choose pulse width.
3. Optical Return Loss (ORL): It represents the total reflected optical power from a complete fibre link, includes the portion from backscattering as well as the reflected power from optical connectors and medium discontinuities.

Following are the various steps involved in the method.
1. First step of any supervised learning is to collect data for training. For that networks with different topology have been created i.e, different level of split, different maximum fibre length, different number of ONTs etc. Then OTDR parameters are configured manually to characterize the network accurately i.e we have chosen pulse width, range and time which give us best characterization of network. In this way we have created labelled data for each network. Three independent and three dependent variables per network. Similarly, this kind of data is generated for each network.
2. Second step is to use data that we have generated in step 1, to find the regression coefficients (unknown variables in regression model) using the model described above.
3. Once the coefficients have been found, any test data can be performed and to predict the output which is optimum in least square sense.

Following are the different steps involved.
a. Acquire trace at pulse width (3 us) and Range (60 km) as these are good enough to see GPON. It can be changed depending on fibre networks.
b. Resulting trace will give us maximum distance of the fibre under test, link loss of the network and ORL of the network.
c. Now put these three input or independent parameters in regression equation to find three dependent parameters using the model and regression coefficients found step.

We claim:

1. A method for configuring an optical time domain reflectometer (OTDR) in a gigabit passive optical network (PON), comprising:
collecting network data of the network to be scanned by a switch controller to characterize said network;
collecting data from various optical network terminals (ONTs) of the gigabit passive optical network (GPON) by an OTDR and the switch controller to form a training database, the training data being used to train the method; and
optimizing the parameters of the optical time domain reflectometer (OTDR) based on the network data and the training database by a processor provided on the switch controller using machine learning.

2. The method as claimed in claim 1, wherein the parameters of optical time domain reflectometer (OTDR) are selected from the group consisting of pulse width, acquisition time and distance range or a combination thereof.

3. The method as claimed in claim 1, wherein the network data is selected from the group consisting of maximum distance of the fibre from optical line terminal (OLT) in the GPON, link loss and optical return loss or a combination thereof.

4. A system for configuring an optical time domain reflectometer (OTDR) in a gigabit passive optical network (GPON), the system comprising:

a switch controller configured for collecting network data from a network to be scanned characterizing said network, the switch controller having:
  an optical time domain reflectometer (OTDR) to be configured, the OTDR and the switching controller operable for collecting data from various optical network terminals (ONTs) of the gigabit passive optical network (GPON) to form a training database;
an optical switch; and
a processor adapted to configure the optical time domain reflectometer (OTDR) by optimizing the parameters of optical time domain reflectometer (OTDR) based on the network data using the training database.

5. The system as claimed in claim 4, wherein the optical switch is configured to receive signal from optical time domain reflectometer (OTDR) while scanning said network to be scanned.

6. The system as claimed in claim 4, wherein the switch controller further comprises a plurality of wavelength division multiplexing (WDM) coupler to couple the output of the optical switch to the gigabit passive optical networks (GPON).

7. The system as claimed in claim 4, wherein the system further comprises a plurality of passive power splitters (PS) to split coupled output received from WDM coupler towards various ONTs.

* * * * *